3,099,061
APPARATUS FOR SHAPING AND COMPRESSING SHEETS OF ASBESTOS CEMENT INTO PARTICLES OF COMPLEX CONFIGURATION
Giorgio Marchioli, Via G. B. Morgagni 22, and Giuseppe Gremigni, Via Lomellina 52, both of Milan, Italy
Filed July 6, 1961, Ser. No. 122,158
6 Claims. (Cl. 25—43)

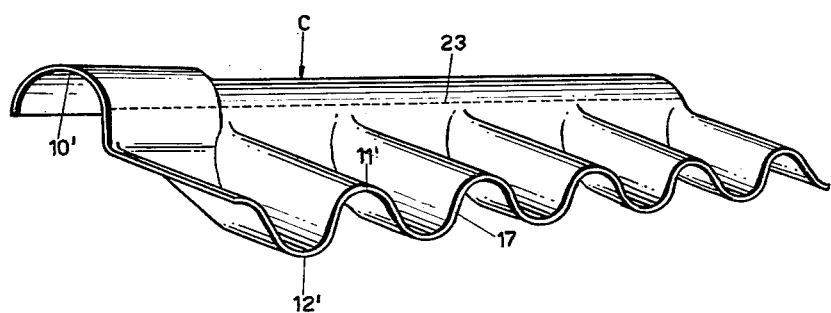
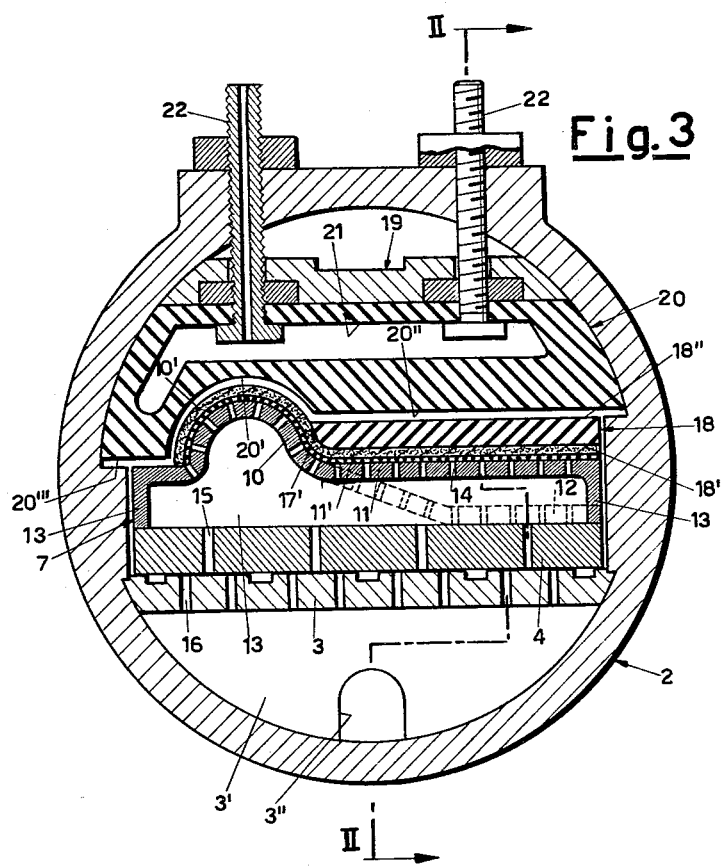

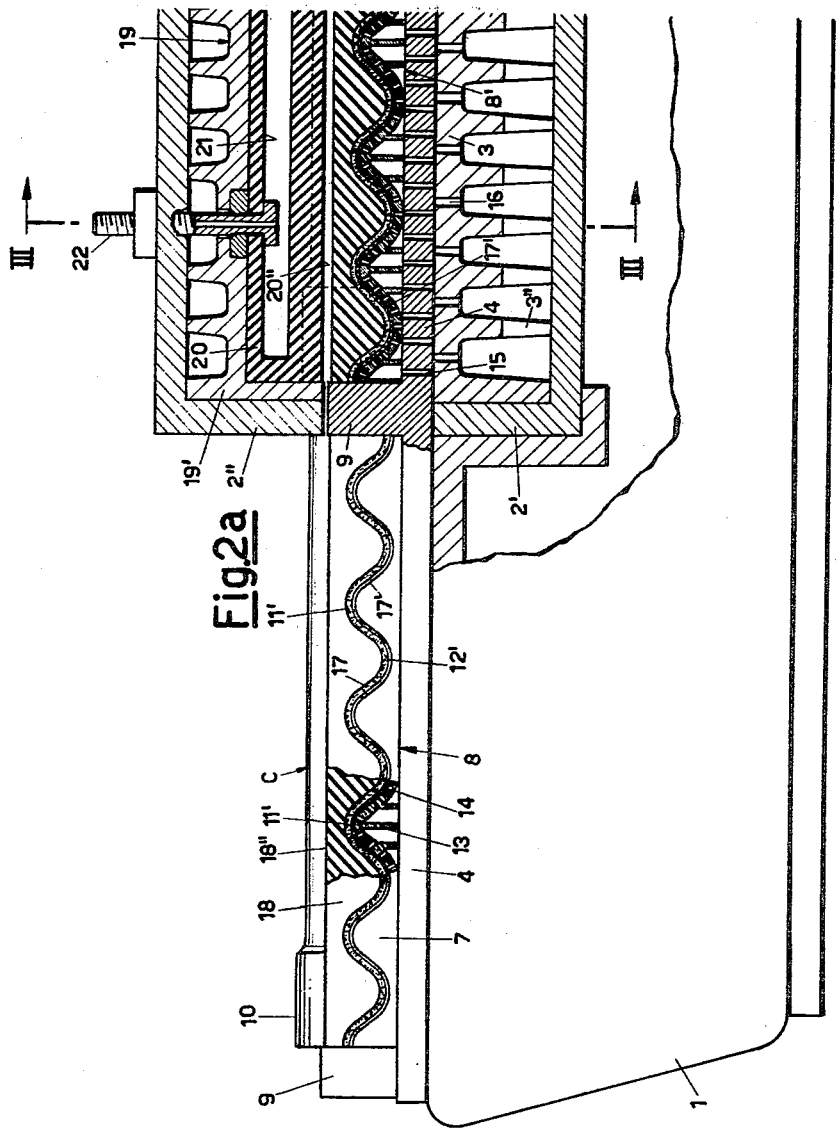

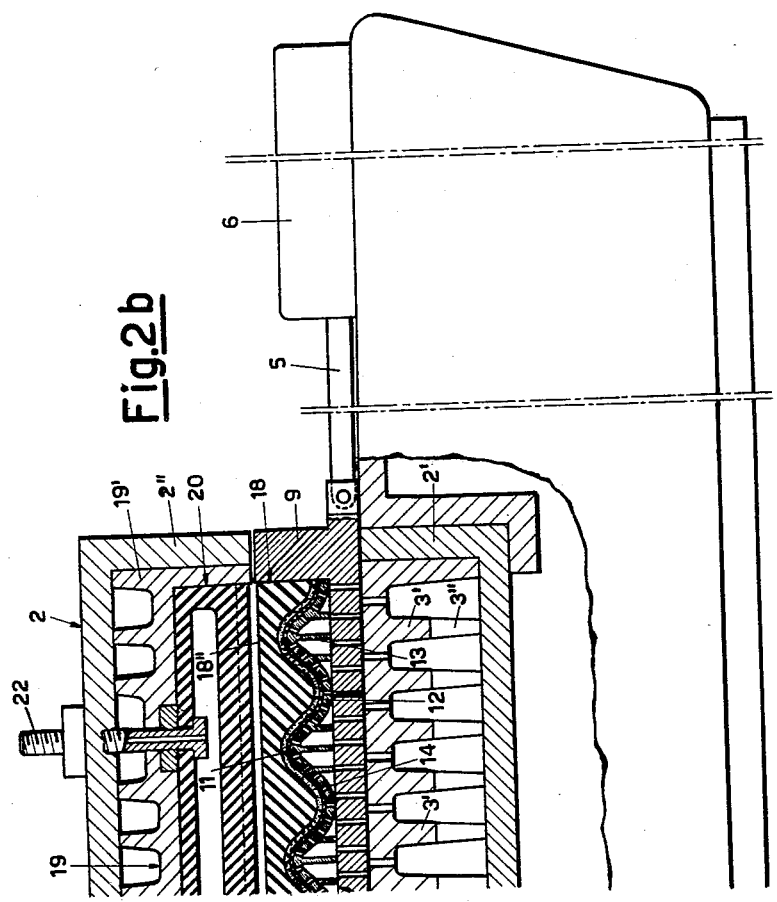

The present invention relates to apparatus for shaping and compressing sheets of plastic material, particularly asbestos cement.

As is known, some roofing tiles or covering members with somewhat complicated shapes, such as, for example, tiles for roof ridges, are made by hand starting with plastic material consisting of a mixture of cement and asbestos in leaf or sheet form (which is obtained by causing a fluid mixture of asbestos cement and water contained in a tank, to be deposited on and adhere to a rotating drum which dips into said tank), which is made to dry between shaped moulds. After more or less drying out between the moulds, the sheet assumes the shape of the moulds.

However, pieces obtained by this process, besides being costly on account of the great length of time required for their manufacture, are not satisfactory because of their uneven thickness, consistency and moisture content, some of the tiles being too hard and others too fragile.

By using the apparatus according to the present invention, these and other drawbacks may be overcome. In accordance with the invention, the sheet of asbestos cement is placed while in the plastic state, on a rigid, contoured part of a mould, a piece of elastically yielding material forming a lower part of the mould and having a lower surface matching that of the upper face of the moulded sheet and a flat upper surface is placed over said sheet, and the whole is introduced into a press by sliding it in a direction parallel to the flat upper surface of the piece of elastically yielding material.

The preferred apparatus according to the present invention has the press thereof, in the form of a rigid tubular housing having end walls with openings therein through which the mould on a slide can be introduced, and an inflatable body inside said tubular housing, which is adapted to press one part of the mould against the other part.

The apparatus according to the invention permits complicated members such as tiles for roof ridges to be produced rapidly and almost continuously; it is hence with reference to asbestos cement roof ridge tiles that the invention will now be more fully described, purely an illustrative example and without limiting the invention thereto.

These ridge tiles have a somewhat complicated shape on account of the several different curvatures of their surfaces which, by departing from a geometrically cylindrical contour, make it impossible to slide the ridge tiles out of their moulds.

The present description makes reference to the accompanying drawings wherein:

FIG. 1 is a perspective view of a roof ridge tile of a usual type;

FIGS. 2a and 2b are a schematic view of the apparatus according to the present invention in a longitudinal section along the line II—II of FIG. 3, and FIG. 3 shows the apparatus in a vertical cross section along the line III—III of FIG. 2a.

With reference to the drawings, the apparatus according to the invention comprises a base 1 which supports a tubular body or housing 2 provided with end walls 2'—2" and with a horizontal plane support or table 3 whereon a slide 4, whose length is at least twice that of the tubular body 2, is free to run horizontally. Slide 4 is displaced axially in relation to body 2 by the stem 5 of a piston housed in a cylinder 6 and driven by a fluid under pressure.

The length of base 1 available for travel of slide 4 thereon is equal to at least three times the length of housing 2 which occupies the middle third of said travel, so that when slide 4 is in its extreme positions, one half thereof is situated inside body or housing 2 and the other half outside said body on one or the other side thereof.

A pair of metal moulds 7 with two lower parts or sections 8 and 8' each of slightly shorter length than one-half the length of slide 4, is mounted on slide 4, said sections being included between and divided by blocks 9. Each of the mould sections 8 and 8' has a curved portion 10 corresponding to the longitudinal curved profile 10' of the ridge member C, and a set of lateral undulations 11 and 12 extending transversely with respect to profile 10 and corresponding to the lateral undulations 11' and 12' of member C. Undulations 11 and 12 are supported by vertical posts 13 resting on slide 4; the flat support table 3 is also provided with vertical posts 3' which are drilled at their bottoms at 3". Mould sections 8, 8', slide 4 and support 3 also have a plurality of holes 14, 15 and 16 respectively.

The presence of a double mould on slide 4, that is of two mould sections 8 and 8', allows the sheet or leaf inside body 2 to be moulded and compressed on one of said sections, either 8 or 8', while a sheet 17 of asbestos cement material is being simultaneously prepared for moulding on the other of said sections. Preferably, a sheet of fine screen or mesh 17' pressed to the shape of each mould part or section 8 and 8' is laid on the latter prior to placing the sheet 17 of asbestos cement thereon.

In accordance with this invention, each mould further includes an upper part formed by a piece 18 of elastically yielding material, such as natural or synthetic rubber, and which is placed over undulations 11 and 12. Each upper mould part 18 has its bottom side 18' corrugated to match mould part 8 or 8', while its upper side 18" is flat and substantially horizontal.

In the upper part of tubular body 2 there is fixed a support 19 fitted with end walls 19', and below it and joined integrally thereto is an inflatable body 20 which is also of elastically yielding material and is provided with a central chamber 21 into which, by means of a liquid-tight conduit 22, a fluid under pressure supplied from a convenient source can be introduced. Body 20 can in this manner be inflated so as to press sheet 17 directly on the part thereof which lies above profile 10 of mould 7, and indirectly, through upper mould part 18, on the part lying above profiles 11—12.

As may be seen from the drawing (FIG. 3), the inflatable body 20 has, corresponding to part 10 of mould part or section 8 or 8', a recess 20', while it is flat above piece 18 at 20" and also at 20'". It is apparent, however, that piece 18 could cover the whole of the top of piece C which has to be moulded, instead of, as in FIG. 3, reaching only to the height corresponding roughly to the broken line 23 (see FIG. 1); and in this case, the inflatable piece 20 would also be flat and the zones 20" and 20'" would merge into a single flat surface.

It is manifest from FIG. 3 that the inflatable body is retained at its ends by the end walls 19' of support 19, and there is thus no axial dilation of body 20; further, the vertical distance separating end walls 2" and blocks 9, which allows free axial movement to the mould 7, is very small, and hence the material composing the body 20 cannot be extruded through this clearance.

By reason of the combination of moulds each having a rigid lower part 8 or 8' and an elastic upper part 18 with the inflatable body 20, the pressure exerted on the sheet 17, although it is forceful and sufficient to squeeze out perfectly the water from said sheet (which water passes through holes 14, 15, 16, and is discharged through 3"), yet adjusts itself to any small variations in the hardness of sheet 17, giving a finished product of completely uniform thickness and compactness, and this is achieved, thanks to the provision of the double mould 7, in a rapid, and hence economical, and almost continuous manner.

We claim:

1. An apparatus for shaping and compressing sheets of asbestos cement into articles of complex configuration, comprising
   A. a horizontal, rigid tubular housing including end walls having substantially centrally located openings therein,
   B. a slide having a length at least twice as large as the length of said housing and being slidable through said openings in the end walls of the housing so as to selectively dispose different portions of said slide within said tubular housing,
   C. a mould carried by each of said portions of the slide, each mould including
      (1) a rigid lower part having an upper surface conforming to the underside of an article to be shaped thereby, and
      (2) a removable, elastically yieldable solid upper part extending over at least a section of said lower part to receive a sheet of asbestos cement therebetween when the related portion of said slide is disposed outside of said housing,
      (3) said elastically yieldable upper part of the mould having a lower surface conforming to the configuration of the corresponding part of an article to be shaped by the mould,
   D. an inflatable body fixed within said housing above said slide, and
   E. means for supplying fluid under pressure to said body so as to inflate the latter and thereby cause the body to press said elastically yieldable upper part of the mould within said housing against the related rigid lower part for compressing and shaping the sheet of asbestos cement therebetween into the form of a desired article.

2. An apparatus as in claim 1; wherein said slide has blocks thereon at the opposite ends of each of said portions, which blocks are shaped to close said openings in the end walls of the housing when the related portion of the slide is fully disposed within the housing, thereby to avoid extrusion of said body through said openings upon inflation of the body.

3. An apparatus as in claim 1; wherein the upper surface of said yieldable upper part of each mould is flat and the corresponding area of the lower surface of said inflatable body is also flat.

4. An apparatus as in claim 1; wherein said housing has a perforated table extending horizontally therein to slidably support said slide, and said slide and said rigid lower part of each mould also have perforations to permit liquid to drain therethrough during the compressing of a sheet of asbestos cement in each mould.

5. An apparatus as in claim 1; wherein said yieldable upper part of each mould extends over only a section of the related rigid lower part and has a flat upper surface; and wherein the lower surface of said inflatable body has a flat section coextensive with said flat upper surface of the yieldable upper part of each mould and a contoured section corresponding in shape to that of the section of said rigid lower part extending beyond said yieldable upper part.

6. An apparatus as in claim 1; further comprising hydraulically operated means for longitudinally reciprocating said slide so as to alternately dispose said portions of the slide within said housing and outside of the latter.

References Cited in the file of this patent

UNITED STATES PATENTS

| | | |
|---|---|---|
| 1,209,308 | Lanhoffer | Dec. 19, 1916 |
| 2,048,253 | Freyssinet | July 21, 1936 |
| 2,730,783 | Kennison | Jan. 17, 1956 |
| 2,856,667 | Gorsuch | Oct. 21, 1958 |
| 2,865,079 | Marchioli et al. | Dec. 23, 1958 |
| 2,975,476 | Burke | Mar. 21, 1961 |